(12) United States Patent
Patel et al.

(10) Patent No.: US 7,061,207 B2
(45) Date of Patent: Jun. 13, 2006

(54) CELL EQUALIZING CIRCUIT

(75) Inventors: Sanjay Patel, Romford (GB); Chris D Shelton, London (GB); Lawrence S Tyson, Surrey (GB)

(73) Assignee: H2EYE (International) Limited, Tortola (VG)

( * ) Notice: Subject to any disclaimer, the term of this patent is extended or adjusted under 35 U.S.C. 154(b) by 288 days.

(21) Appl. No.: 10/216,090

(22) Filed: Aug. 9, 2002

(65) Prior Publication Data

US 2004/0027092 A1 Feb. 12, 2004

(51) Int. Cl.
*H02J 7/00* (2006.01)

(52) U.S. Cl. ..................................... 320/119; 320/116

(58) Field of Classification Search .................. 320/119, 320/116, 118, 120, 121, 140; 363/15, 30, 363/34

See application file for complete search history.

(56) References Cited

U.S. PATENT DOCUMENTS

| | | | | | |
|---|---|---|---|---|---|
| 4,316,185 | A | * | 2/1982 | Watrous et al. | 340/636.11 |
| 4,742,441 | A | * | 5/1988 | Akerson | 363/97 |
| 5,646,504 | A | | 7/1997 | Feldstein | 320/119 |
| 6,297,616 | B1 | * | 10/2001 | Kubo et al. | 320/116 |
| 6,373,223 | B1 | * | 4/2002 | Anzawa et al. | 320/118 |
| 6,430,444 | B1 | * | 8/2002 | Borza | 607/61 |

FOREIGN PATENT DOCUMENTS

| JP | 04284845 A | * | 10/1992 |
|---|---|---|---|
| JP | 404284845 A | * | 10/1992 |

OTHER PUBLICATIONS

Kutkut, Nasser H. et al. "Dynamic Equalization Techniques for Series Battery Stacks." 1996 IEEE. XP 000699874.
Sakamoto, H. et al. "Balanced Charging of Series Connected Battery Cells." 1998 IEEE. XP 010350616.

* cited by examiner

*Primary Examiner*—Donald Sparks
*Assistant Examiner*—Lawrence Luk
(74) *Attorney, Agent, or Firm*—Renner, Otto, Boisselle & Sklar, LLP

(57) ABSTRACT

An electric circuit for equalizing voltages between serially arranged cells. The circuit is operable to generate AC voltages at amplitudes dependent on the DC voltages of the received cells. The AC voltages are all connected to an inductive coupling circuit. The inductive coupling allows higher-voltage cells to induce a recharging current flow in lower voltage cells and so equalize the cell voltages. The circuit also operates to ensure that cell voltages are maintained in equilibrium during charging or discharging of received cells, irrespective of the individual charging and discharging characteristics of the cells. The circuit thus prevents individual cells in a battery from being overcharged or over-discharged and allows more efficient use of the full capacity of a battery without risking damage to the individual cells. The cell equalizing circuit is thus especially useful for rechargeable cells, such as lithium-ion cells, which are sensitive to damage by over-charging and over-discharging.

19 Claims, 9 Drawing Sheets

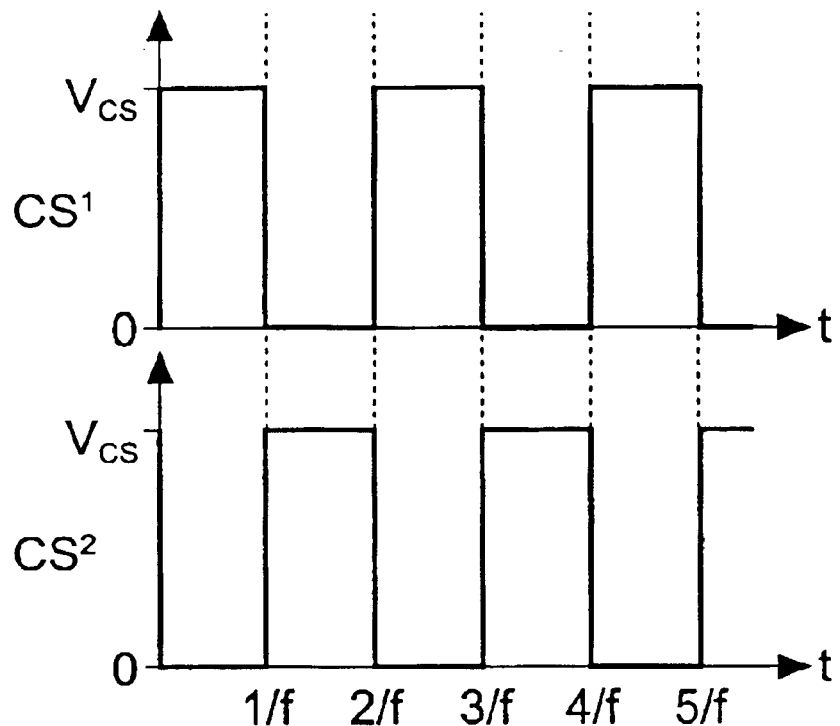
Fig. 4a
Fig. 4b
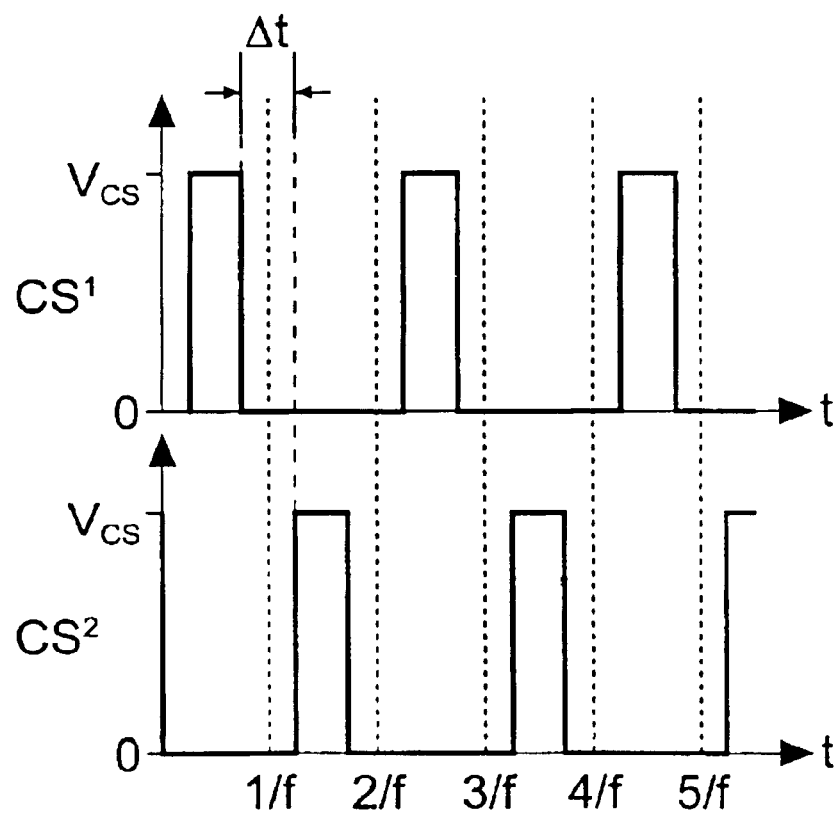
Fig. 5a
Fig. 5b

CELL EQUALIZING CIRCUIT

BACKGROUND OF THE INVENTION

The invention relates to electric circuits for equalizing cell voltages within a battery of cells.

Many products employ a battery of cells as a power source and a great deal of research effort is directed towards designing cells which provide the best possible performance characteristics. Characteristics of interest include cell voltage, cell capacity, and for re-chargeable batteries, cell charge-discharge cycle lifetime and cell behavior during charging and discharging.

For the various types of cell currently available, individual voltages are typically on the order of a few volts. However, many applications require higher voltages and so use a battery of cells connected in series to provide an overall battery voltage equal to the sum of the cell voltages in the battery.

FIG. 1 is a schematic diagram showing a battery 1 comprising eight serially-connected rechargeable lithium-ion (li-ion) cells 2A–H. The battery 1 is connected to a load 4, in this example a motor, via a load-switch 6. The battery 1 is also connected to a charger 8 via a charger-switch 10. The eight cells 2A–H respectively provide cell voltages $V^{DC}_{A-H}$. The battery voltage (i.e. the voltage difference between a battery cathode 12 and a battery anode 14) is $V^{DC}_{batt}$ and is equal to the sum of the individual cell voltages $V^{DC}_{A-H}$. Each of the cells 2A–H provides a nominal cell voltage of 4V and the battery 1 accordingly provides a nominal battery voltage of 32.0V.

When the battery is in use the load-switch 6 is closed and the charger-switch 10 is open (as shown in FIG. 1). In this switch configuration, the battery voltage is applied to the load and the load draws a current $I_L$ from the battery, no current is supplied by the charger 8. When the cells are supplying current in this manner, they are said to be discharging.

When the battery is being charged the load-switch 6 is open and the charger-switch 10 is closed. In this switch configuration, the charger 8 supplies a current $I_C$ to the battery for recharging the cells 2A–H whilst the load draws no current from the battery. When the cells receive current in this manner they are said to be charging.

Since the cells 2A–H in the battery 1 are connected in series, Kirchoff's current flow law ensures that the current $I_L$ ($I_C$) passes equally through each of the cells during discharging (charging). For example, if during discharge the battery supplies 1 amp for 1 second (so passing a total charge of 1 coulomb through the load), the capacity of each individual cell is reduced by 1 coulomb, irrespective of the individual cell voltages $V^{DC}_{A-H}$. Similarly, if the battery 1 receives 1 amp for 1 second from the charger, the capacity of each individual cell is increased by 1 coulomb.

The discharging and charging characteristics of even nominally identical cells will generally be different. Differences in internal geometry and chemical composition will occur even in cells manufactured within a single batch. The cells 2A–H in the battery 1 will typically have different total capacities and different rates of voltage decay (increase) during discharging (charging). It is known that for a cell to provide optimum performance parameters, for example maximum capacity, high charge/discharge cycle lifetime etc., it should generally not be charged above an over-charge threshold or discharged below a deep-discharge threshold. Differences in the charging and discharging characteristics of cells in a battery make it difficult to properly manage the charging and discharging of individual cell, this can significantly reduce the overall battery performance.

As an example of problems which can arise during discharging, suppose cell 2A in the battery shown in FIG. 1 has a lower capacity than the cells 2B–H (which are identical) such that $V^{DC}_A$ falls faster than $V^{DC}_{B-H}$. All cells are initially charged to 4.0V to provide an initial battery voltage of 32V (although the load can operate with a battery voltage as low as 24V). After a period of discharge, the voltages of cells 2B–H falls to 3.5V, whilst in the same period the voltage of cell 2A falls to 3V. The battery voltage is now 27.5V. If 3.0V represents the deep-discharge threshold, further use of the battery will have a deleterious effect on cell 2A. However, if discharge is stopped to protect cell 2A, the remaining capacity of cells 2B–H is unused, and the battery requires recharging before its total useful capacity has been exhausted. Furthermore, if individual cells are to be protected, a voltage monitor circuit is required for each cell.

As an example of problems which can arise during charging, again suppose cell 2A has a lower capacity than the cells 2B–H (which again are identical) such that $V^{DC}_A$ rises faster than $V^{DC}_{B-H}$ during charging. All cells are initially at 3V, but after a period of charging, the voltage of cells 2B–H rises to 3.6V but in the same period the voltage of cell 2A rises to 4.2V. At this point, the battery voltage is 29.2V. If 4.2V represents the over-charge threshold, further charging of the battery will have a deleterious effect on cell 2A. However, if charging is stopped to protect cell 2A from over-charge, the battery voltage is limited to 29.2V, so reducing its capacity during subsequent use. If each cell is to be individually protected, a voltage monitor circuit is again required for each cell.

SUMMARY OF THE INVENTION

According to a first aspect of the invention there is provided an electric circuit for receiving a battery of cells in series, comprising: a plurality of DC-to-AC converters each having a DC-side arranged to connect across positive and negative terminals of cells received by the circuit and an AC-side for carrying an AC voltage converted from the DC-side; and an inductive coupling between the AC-sides of the DC-to-AC converters to provide an effective current transfer between cells responsive to differences in DC voltages between them.

By allowing an effective transfer of current between received cells, the received cell voltages can be maintained equal, either during charging or discharging of the cells. The electric circuit loaded with cells thus removes any disparity in voltage between the cells. Cells which are under-voltage are charged by the other cells and cells which are over-voltage are discharged by the other cells. The circuit thus ensures that an individual cell in a battery is not inadvertently discharged below its deep-discharge threshold or charged above its over-charge threshold. In addition, during discharge, maximum utilization of the available capacity of all cells in the battery is ensured.

For rechargeable cells, the invention thus maximizes battery life in terms of numbers of charge/discharge cycles by preventing cell damage. For rechargeable or non-rechargeable cells, whether rechargeable or not, the invention maximizes battery life within a single discharge by ensuring even discharge of all cells within the battery.

Alternatively, the circuit of the invention may be viewed as a simpler and more elegant solution than providing a circuit which individually monitors the voltage of each of a number of cells during charge or discharge.

The equalizing circuit is especially useful for cells which are sensitive to over-charging or over-discharging beyond their deep-discharge thresholds. This is true of lithium ion cells and lead-acid cells.

The inductive coupling may be conveniently implemented with transformer windings. The windings are preferably wound around a common core to increase coupling efficiency. The transformer windings may further comprise a center-tap between two end-taps with alternate phases of the AC voltages applied between the center-tap and one or other of the end-taps. This allows for efficient inductive coupling of the DC to AC converters using readily available technology.

It will be appreciated that, although preferred for most applications, it is not essential to provide a DC-to-AC converter for each cell of the battery. One DC-to-AC converter could be provided for each group of two or more cells.

In embodiments of the invention, each of the DC-to-AC converters comprises a first switch responsive to a first control signal for providing a first polarity of the AC voltage and a second switch responsive to a second control signal for providing a second polarity of the AC voltage. By employing a center-tapped transformer and appropriate switching of the switches, effective DC to AC conversion can be achieved simply and with a minimum number of switching components. The first and second switches may be field effect transistors since these allow rapid switching with only a modest voltage drop when in conduction. In operation, the control signals are provided such that a time delay occurs between activation of the first and second switches. This helps to ensures that the two windings of each of the center-tapped transformer windings do not both conduct at the same time.

The control signals may be coupled to the switches via one or more control signal capacitors, or via one or more control signal transformers. By capacitively or inductively coupling the control signals to the switches, a single control signal can control the switches associated with different received cells which, in general, will have different terminal voltages. (A DC application of a common control signal to all the switches would therefore not be workable.)

The electric circuit may further comprise a comparator configured to output a status responsive to a comparison between a first voltage dependent on a first group of received cells and a second voltage dependent on a second group of received cells. This allows a single comparator to monitor the operation of the cell equalizing circuit.

According to a second aspect of the invention there is provided an electrically powered device including a cell equalizing electric circuit. The electrically powered device may, for example, be one of a portable computer, a portable video camera, a digital camera, a global positioning receiver, a portable television, a mobile telephone, a submarines, an electric vehicles, or a wheel chair.

BRIEF DESCRIPTION OF THE DRAWINGS

For a better understanding of the invention and to show how the same may be carried into effect reference is now made by way of example to the accompanying drawings in which:

FIGS. 4a and 4b respectively show examples of first and second control signal waveforms for controlling the cell equalizing circuit shown in FIG. 3;

FIGS. 5a and 5b respectively show another example of first and second control signal waveforms for controlling the cell equalizing circuit shown in FIG. 3;

DETAILED DESCRIPTION

Figure 1:
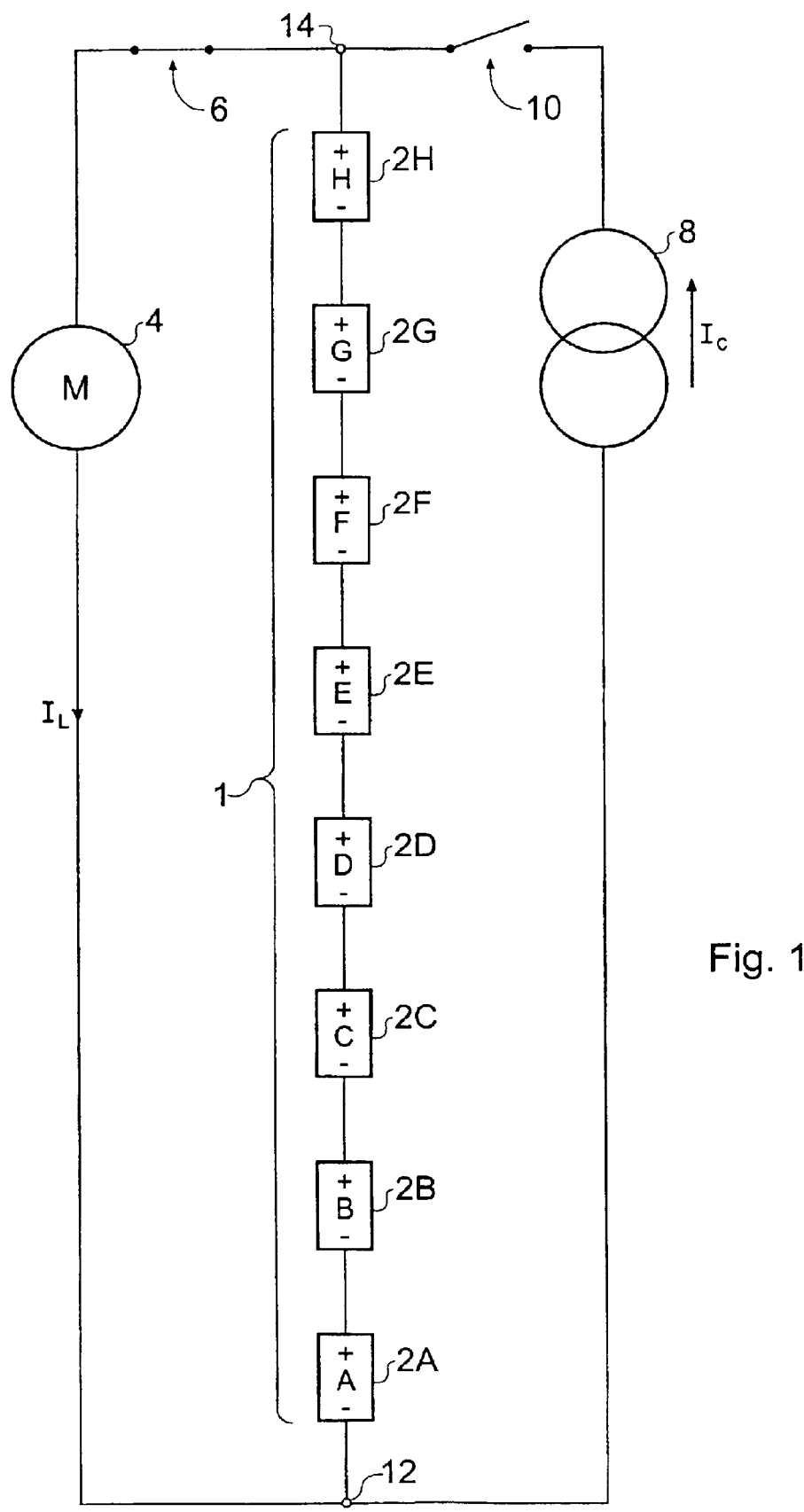
FIG. 1 shows a battery of rechargeable cells switchably connected to a motor and a charger according to the prior art.
Figure 2:
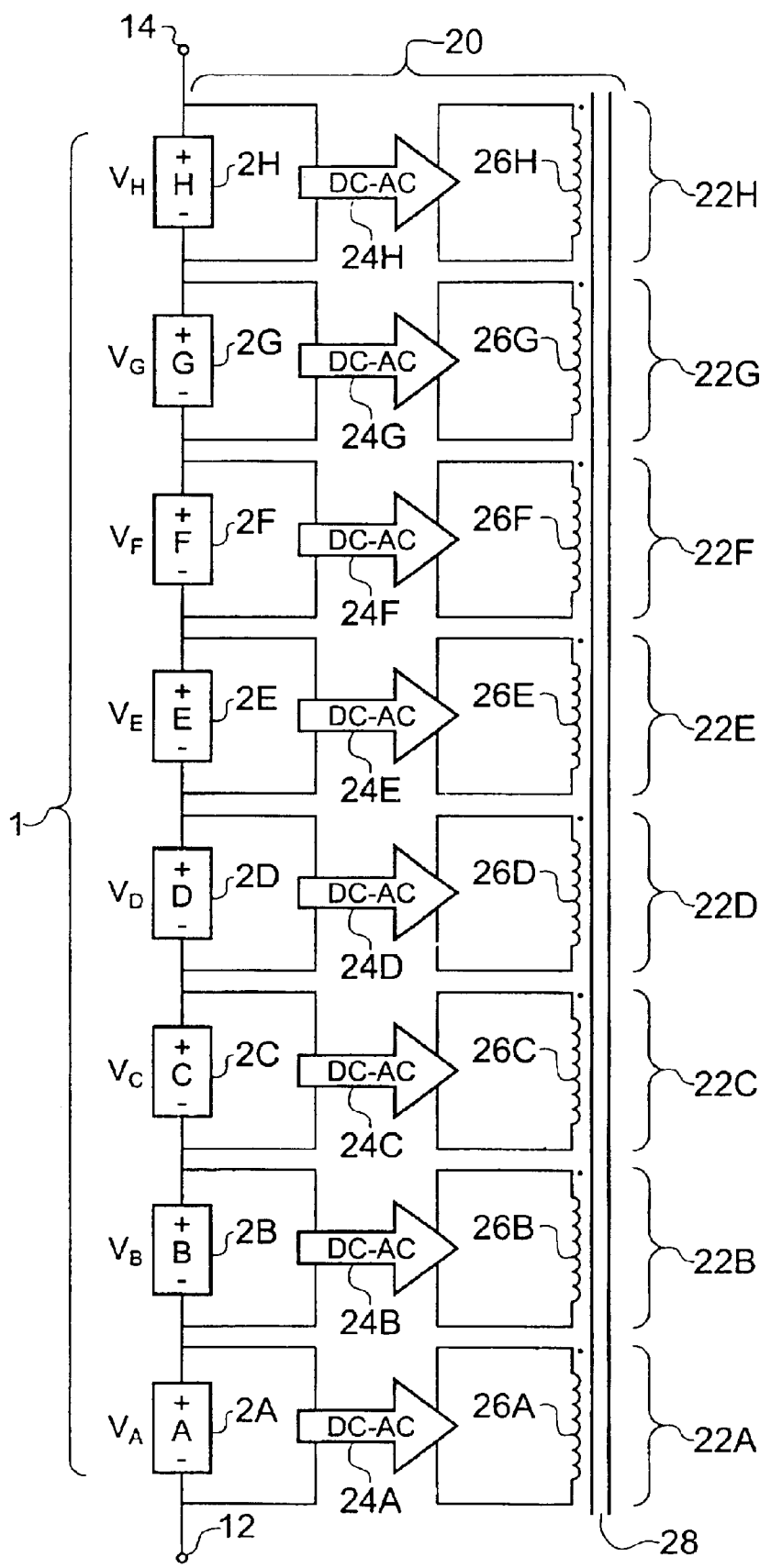
FIG. 2 shows a cell equalizing circuit for equalizing the voltages of cells in a battery according to an embodiment of the invention.

FIG. 2 is a diagram schematically showing the underlying principle of an equalizing circuit 20 for equalizing cell voltages of eight cells 2A–H according to an embodiment of the invention. The cells 2A–H form a battery 1 with a cathode 12 and an anode 14. These features are similar to and will be understood from the description of the correspondingly numbered features seen in FIG. 1. The equalizing circuit 20 includes eight similar circuit modules 22A–H and a single ferrite core 28.

The circuit module 22A includes a direct current to alternating current (DC to AC) converter 24A and an inductive winding 26A. The cell 2A is connected to an input of the DC to AC converter and the DC to AC converter is operable to convert a DC cell voltage $V^{DC}_A$ of the cell 2A to an AC voltage $V^{AC}_A$. The AC voltage $V^{AC}_A$ has an amplitude dependent on the DC voltage $V^{DC}_A$ and a frequency f. The AC voltage $V^{AC}_A$ is coupled to the inductive winding 26A as indicated in the figure.

The circuit modules 22B–H are similar to and will be understood from the description of the circuit module 22A above. The eight inductive windings 26A–H are all wound about the single ferrite core 28 in the same direction such that they are mutually inductively coupled. In practice, the single ferrite core 28 and inductive windings 26A–H might take the form of a transformer with eight geometrically similar windings. The transformer could be planar, toroidal or any other configuration as is known in the art of transformer design.

The equalizing circuit 20 serves to equalize the cell voltages $V^{DC}_{A-H}$ by allowing inductive current transfer between cells of different voltage. Current is effectively drawn from higher voltage cells to charge lower voltage cells. It will be appreciated that this current transfer is only an effective current transfer since no actual transfer of charge carriers between cells takes place via the inductive windings. If required, the equalizing circuit can operate without a load or a charger connected to the battery to ensure all of the cell voltages $V^{DC}_{A-H}$ are made equal when at rest. However, without an external load or charger, the cells will reach equilibrium in a short time (i.e. the cell voltages $V^{DC}_{A-H}$ will become equal) and further operation of the circuit is unnecessary (unless differences in the internal current leakage of the cells 2A–H are a concern). In some cases the circuit will therefore operate only during periods of charging or discharging of the battery to ensure the cell voltages $V^{DC}_{A-H}$ are kept equal during these processes.

The general operation of the equalizing circuit is most simply explained by a specific example in which the battery is not connected to a load or a charger, and in which the initial cell voltages $V^{DC}_{A-H}$ are not equal. In the battery of cells shown in FIG. 2, the initial cell voltage $V^{DC}_A$ is assumed to be 3.5V and the initial cell voltages $V^{DC}_{B-H}$ are assumed to be 4.0V. The DC to AC converter in circuit module 22A generates an AC voltage $V^{AC}_A$ at a frequency $f$ which is applied to the inductive winding 26A, causing an AC current $I^{AC}_A$ to flow in the inductive winding 26A. The DC to AC converters in circuit modules 22B–H respectively generate AC voltages $V^{AC}_{B-H}$ (also at frequency $f$) which are respectively applied to the inductive windings 26B–H, causing AC currents $I^{AC}_{B-H}$ to flow. Each of the AC currents $I^{AC}_{A-H}$ contribute towards a net alternating magnetic flux within the single ferrite core 28. If there is good inductive coupling between the inductive windings 26A–H then, to a first approximation, the total magnetic flux within the single ferrite core 28 induces equal reverse currents (i.e. $\pi$ out of phase with the inducing AC currents $I^{AC}_{A-H}$) in each of the inductive windings. The reverse currents $I^{AC}_{rev}$ are equal in amplitude to the average of the AC currents $I^{AC}_{A-H}$. The magnitude of $I^{AC}_A$ is therefore less than the magnitude of $I^{AC}_{rev}$ (since $V^{AC}_A$ is less than the average of $V^{AC}_{A-H}$) and accordingly there is a net reverse AC current flow in the inductive winding 26A. The amplitudes of $I^{AC}_{B-H}$, on the other hand, are greater than the amplitude of $I^{AC}_{rev}$ (since each of $V^{AC}_{B-H}$ is greater than the average of $V^{AC}_{A-H}$) and accordingly there is a net forward AC current flow in each of the inductive windings 26B–H. The DC to AC converter (or additional circuitry) is operable to convert the net reverse AC current flow in circuit module 22A to a DC current flow at the input side of the DC to AC converter 24A, and so charge the cell 2A. The net forward AC current flow in each of the inductive windings 26B–H is maintained by a DC current drain on each of the cells 2B–H. In summary, the inductive coupling between the cells 2A–H allows the under-voltage cell 2A to effectively parasitically draw current from the other cells until the cell voltages reach equilibrium, at which point the net AC current flow in each inductive winding 26A–H will be zero (as noted above, this parasitic current transfer is only an effective transfer since no actual charge flows between cells, but rather a sufficiently high reverse voltage is induced in the circuit module 22A to overcome the cell voltage $V^{DC}_A$ and so drive current from the cathode to the anode (and in doing so charging) of the under-voltage cell 2A).

It will be understood that whilst the above description has concentrated on a single under-voltage cell being charged by the other cells in the battery, a single over-voltage cell would similarly discharge so as to charge the other cells in the battery until equilibrium is reached (i.e. when each cell contributes equally to the total magnetic flux in the single ferrite core 28). Similarly, if the cells display a range of cell voltages, the equalizing circuit operates to bring each cell into equilibrium with net effective current transfer from the most over-voltage cells to the most-under voltage cells.

Whereas in this example the battery 1 is not connected to either a load or a charger, it will be understood that the equalizing circuit 20 will operate equally well when the battery is charging or discharging. When the equalizing circuit 20 is operating under charging or discharging, initial differences in the cell voltages are first removed as described above. Furthermore, after reaching equilibrium, differences in the cell voltages which start to develop (for example, due to differences in the cell charging/discharging characteristics) are also removed by the same parasitic current transfer mechanism. In such cases, the equalizing circuit operates to ensure that the cell voltages are maintained equal throughout a charging or discharging process.

Figure 3:
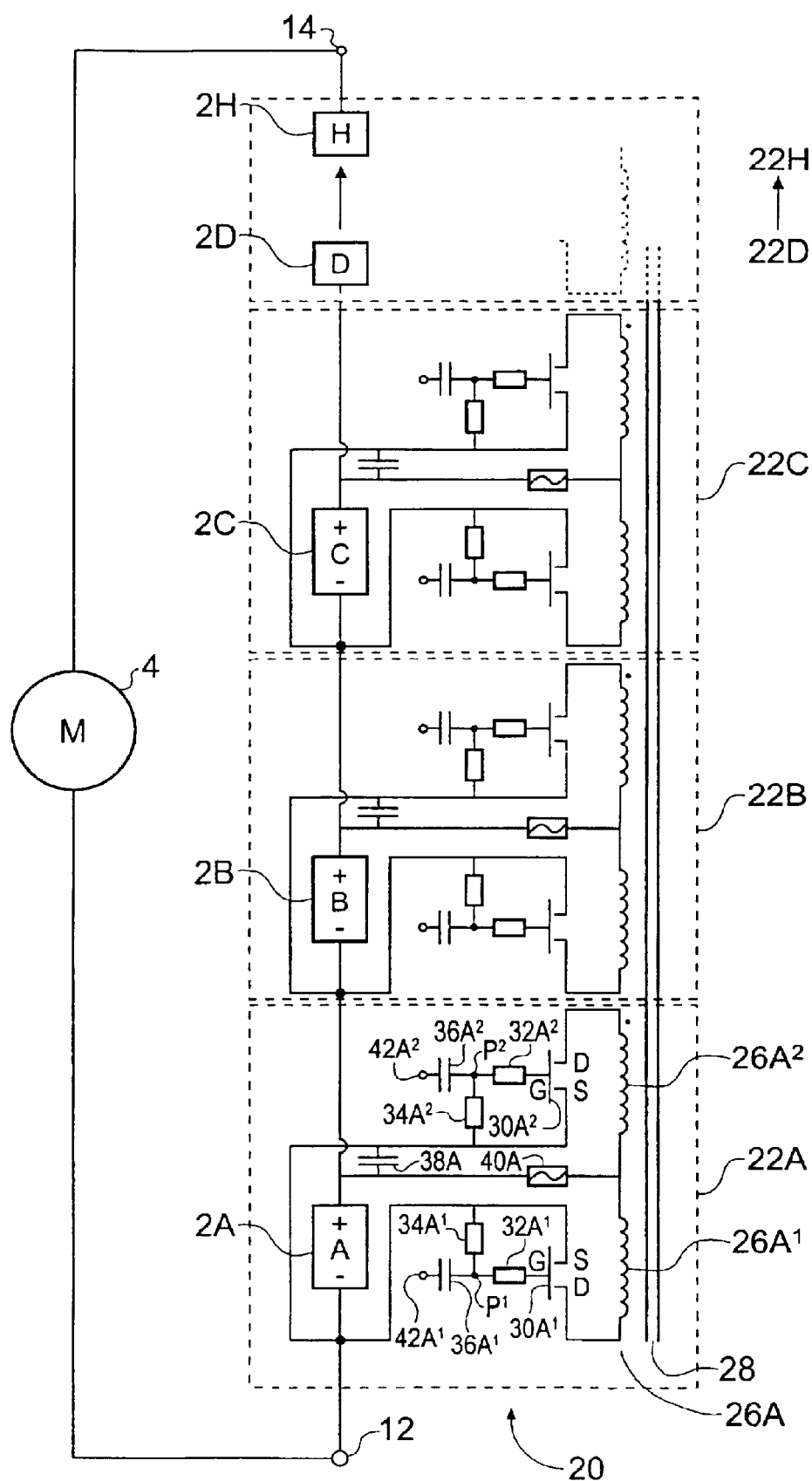
FIG. 3 shows an example cell equalizing circuit controlled by capacitively coupled control signals.

FIG. 3 is a schematic diagram of a first example showing how an equalizing circuit 20 of the type shown in FIG. 2 can be implemented. A plurality of cells 2A–H form a battery 1 with a cathode 12 and an anode 14. The battery 1 is connected to a load 4. These features are similar to and will be understood from the correspondingly numbered features described above. The equalizing circuit 20 comprises eight circuit modules 22A–H (i.e. one for each of the cells 2A–H). However, for simplicity, only three circuit modules 22A–H (and three corresponding cells 2A–H) are shown in FIG. 3. The remaining circuit modules, and their respective connections, will be understood from the following description. Only circuit module 22A is described in detail since circuit modules 22B–H are similar to and will be understood from the description of circuit module 22A.

The circuit module comprises an inductive winding 26A, first and second field effect transistors (FETs) $30A^1$, $30A^2$ (with gate, source, and drain terminals marked G, S and D respectively), first and second gate-input resistors $32A^1$, $32A^2$, first and second tie-down resistors $34A^1$, $34A^2$, first and second input capacitors $36A^1$, $36A^2$, first and second control signal input terminals $42A^1$, $42A^2$, a smoothing capacitor 38A and a fuse 40A. The inductive winding is center-tapped to effectively provide first and second inductive windings $26A^1$, $26A^2$ which are respectively connected between a center-tap one or other of two end-taps. The inductive windings 26A–H are again wound in the same direction on a single ferrite core 28. The smoothing capacitor 38A reduces switching noise induced on the cell voltages by the operation the DC to AC converters.

In one specific example of the equalizing circuit shown in FIG. 3, the FETs $30A^1$, $30A^2$ are n-channel metal oxide semiconductor FETs, the gate-input resistors $32A^1$, $32A^2$ are 10Ω carbon film resistors, the tie-down resistors $34A^1$, $34A^2$ are 10 kΩ carbon film resistors, the input capacitors $36A^1$, $36A^2$ are 4.7 nF ceramic capacitors, the smoothing capacitor 38A is a 68 µF electrolytic capacitor and the fuse 40A is a fast-blow 2A fuse. It will be understood that other component values and component types may be used, for instance the circuit would function similarly if the 10Ω carbon film resistors were replaced with 20Ω wire wound resistors.

In operation, a first AC control signal $CS^1$ is applied to the first control signal input terminal $42A^1$ and a second AC control signal $CS^2$ is applied to the second control signal input terminal $42A^2$. The FETs, the gate-input resistors, the tie-down resistors, the input capacitors, the control signal input terminals and their associated AC control signals collectively provide the functionality of the DC to AC converters 22A–H described above.

FIGS. 4a and 4b are graphs schematically showing example first and second AC control signal waveform voltages as a function of time t. The AC control signals can be generated in any known manner. In this example, the first AC control signal $CS^1$ (shown in FIG. 4a) is a square wave at a frequency $f$ and with an amplitude of $V_{CS}$. The second AC control signal $CS^2$ (shown in FIG. 4b) has the same general form as the first AC control signal $CS^1$ but is $\pi$ out of phase as indicated in FIG. 4b. The reference potentials of the AC control signals are tied to the cathode of the battery (which is taken to be at zero potential) and $V_{CS}$ is large enough to bring the gate terminals of the two FETs in circuit module 22H sufficiently positive with respect to their source-terminals that the FETs are switched into conduction (i.e. switched on), but not so large that the gate-source or gate-drain junctions of the FETs in circuit module 22A break down. In practice $V_{CS}$ may match the battery voltage. However, it will be appreciated that in some circumstances it may not be possible to select a suitable value of $V_{CS}$ which would be applicable to all circuit modules. For instance, in embodiments which employ semiconductor junction FETs (for which the gate cannot be forward biased with respect to the conduction channel (and also for which the gate terminal must be held more-negative than the source terminal to stop conduction)) a single value of $V_{CS}$ cannot be applied to all circuit modules. In other embodiments the battery voltage may be too high to allow a suitable value of $V_{CS}$ capable of switching the FETs in the circuit module directly connected to the battery anode without causing gate-source or gate-drain breakdown in the FETs in the circuit module directly connected to the battery cathode to be selected. In these cases individual pairs of AC control signals could be applied to each circuit module. The individual pairs of AC control signals for application to each circuit module could derive from a single pair of AC control signals which are fully DC isolated from each of the circuit modules (e.g. by being entirely capacitively or inductively coupled). The range of appropriate frequencies at which the equalizing circuit can be driven will depend on the characteristics of the inductive windings 26A–H and the single ferrite core 28, in this example $f$ 20 kHz.

Prior to turning on the equalizing circuit (i.e. t<0), the gate terminal of the FET $30A^1$ is held at $V_{A-}$ (the potential of the cathode of cell 2A) by a series connection of the gate-input resistor $32A^1$ and the tie-down resistor $34A^1$. The source terminal of the FET $30A^1$ is also held at $V_A$, by a direct circuit connection, as shown in FIG. 3. However, at t=0, the voltage applied to the control signal input $42A^1$ by the AC control signal $CS^1$ rises to $V_{CS}$. This signal is capacitively coupled through the input capacitor $36A^1$ such that the junction between the gate-input resistor $32A^1$ and the tie-down resistor $34A^1$ rises above $V_{A-}$, and the potential applied to the gate terminal of the FET $30A^1$ correspondingly also rises above $V_{A-}$.

The potential at the gate terminal of the FET $30A^1$ will depend on the input capacitor $36A^1$, gate-input resistor $32A^1$, tie-down resistor $34A^1$ AC control signal amplitude $V_{CS}$ and frequency $f$. These parameters are appropriately selected to ensure the FET $30A^1$ is 'switched on' (i.e. conducts) when the AC control signal $CS^1$ rises to $V_{CS}$. Accordingly, when the AC control signal $CS^1$ rises to $V_{CS}$, current is able to flow from the anode of cell 2A (at potential $V_{A+}$) to the cathode of cell 2A via the first inductive winding $26A^1$. At time t=1/$f$ the AC control signal $CS^1$ returns to 0V (see FIG. 4a) and the gate terminal of the FET $30A^1$ also returns to 0V (it is noted that if the frequency $f$ is sufficiently low, the gate terminal of the FET $30A^1$ may return to 0V before t=1/$f$). When the gate terminal of the FET $30A^1$ returns to 0V, the FET $30A^1$ is 'switched off' (i.e. non-conducting) and conduction stops. At time t=2/$f$ the AC control signal $CS^1$ again rises to $V_{CS}$ and current again flows in the first inductive winding $26A^1$ as described above. The waveform of the AC control signal $CS^1$ shown in FIG. 4a therefore causes current to flow periodically in the first inductive winding $26A^1$ in a direction away from the center-tap.

As will be understood from the above description, the waveform of the AC control signal $CS^2$ shown in FIG. 4b (which is applied to the second control signal input terminal $42A^2$) similarly causes current to flow periodically in the second inductive winding $26A^2$, again in a direction away from the center-tap. However, since the second AC control signal $CS^2$ is raised to $V_{CS}$ in anti-phase with the first AC control signal $CS^1$, current flows in the first and second inductive windings alternately. Furthermore, since current flows in a different direction in each of the first and second inductive windings (i.e. in both cases away form the center-tap, but to different end-taps) the net effect is that of a quasi square-wave AC current flow in the inductive winding 26A driven by an effective net AC voltage $V^{AC}_A$ of amplitude $V^{DC}_A - \delta$ (where $\delta$ represents any voltage drops within the FET switching circuits (e.g. the drain-source voltage drop in the FETs $30A^1$, $30A^2$). The magnitude of $\delta$ contributes to the accuracy to which cell voltages can be equalized, and is preferably small.

Each of the circuit modules 22A–H shown in FIG. 3 operate in the same way to generate effective AC voltages $V^{AC}_{A-H}$ which drive AC currents in the inductive windings 26A–H that contribute to the total magnetic flux within the single ferrite core 28. A circuit module which contributes less than average to the total magnetic flux in the ferrite core 28 will parasitically draw current from the other cells in the manner described above.

It is important that the FETs $30A^1$, $30A^2$ are not conducting (i.e. switched on) at the same time. If this does occur, equal and opposite currents will flow in the first and second inductive windings $26A^1$, $26A^2$ and there will be no net magnetic flux in the single ferrite core 28, and so no reverse currents induced in the inductive windings. The cell is effectively short circuited for any period in which both FETs $30A^1$, $30A^2$ are switched on. Even with AC control signals which are in exact anti-phase, the FETs $30A^1$, $30A^2$ can simultaneously conduct if the R-C time constant of the tie-down resistors $34A^1$, $34A^2$ and the input capacitors $36A^1$, $36A^2$ is sufficiently large. To avoid possible overlap of the FET switching, a dead time is inserted between the switching on and off of alternate FETs in a circuit module.

FIG. 5a and 5b are graphs schematically showing another example of first and second AC control signal waveform voltages as a function of time t. As before, the AC control signals can be generated in any known manner. In this example, the first and second AC control signals $CS^1$, $CS^2$ (shown in FIGS. 5a and 5b respectively) are generally square waves but with a mark to space ratio of less than unity. The AC control signals are otherwise similar to those seen in FIGS. 4a and 4b and are again at a frequency $f$ and with an amplitude of $V_{CS}$. A delay $\Delta t$ (marked in FIG. 5a) between switching helps to ensure that both FETs are not switched on at the same time.

It is also noted that the mark-to-space ratios of the AC control signals $CS^1$ and $CS^2$ should be equal to avoid net current flow over each switching cycle.

Figure 6:
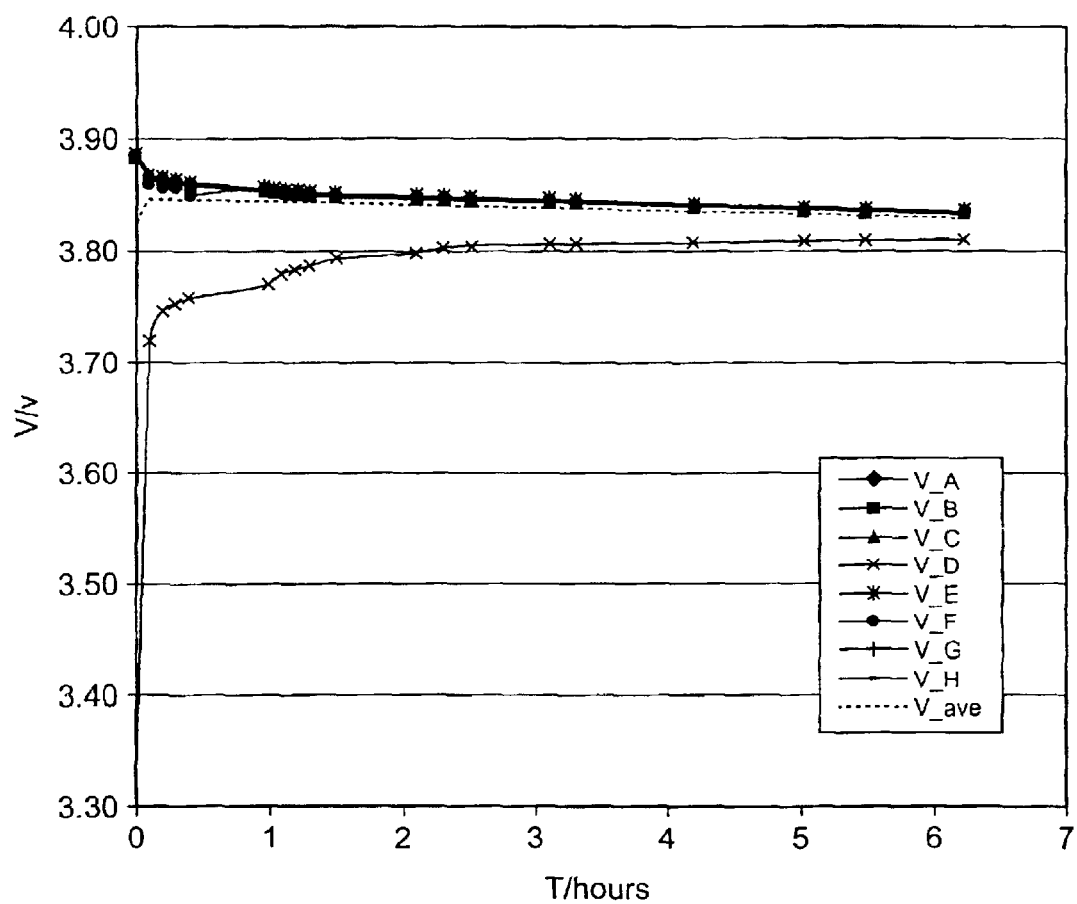
FIG. 6 shows cell voltages equalized by the cell equalizing circuit shown in FIG. 3 as a function of time.

FIG. 6 is a graph showing experimental test results of the voltages $V^{DC}_{A-H}$ of the eight cells 2A–H as a function of time t in hours after turning on the cell equalizing circuit shown in FIG. 3. The average $V_{ave}$ of the cell voltages, which is the same as $V_{batt}/8$, where $V_{batt}$ is the total battery voltage, is also shown as a dotted line. As can be seen from FIG. 6, in the experiment the initial cell voltages of cells 2A–H,E–H are similar, at around 3.89V whilst the initial cell voltage of cell 2D is about 0.5V lower, at around 3.34V. Without the cell equalizing circuit operating and under discharge, the cell 2D would approach the deep-discharge threshold prior to the other cells 2A–C,E–H. However, as can be seen from FIG. 6, the cell equalizing circuit acts to rapidly charge the under-voltage cell 2D. Within around 0.5 hours, the cell voltages of cells 2A–H,E–H have all slightly fallen to around 3.86V, but the cell voltage of cell 2D has risen to around 3.75V (only 0.1V lower than the other cells). The average cell voltage $V_{ave}$ is around 3.85V at this time. After this initial rapid charging of the under voltage cell, the cell equalizing circuit continues to equalize the cell voltages, though more slowly. By t=6 hours, the cell voltages of cells 2A–H,E–H have fallen to around 3.83V, but the cell voltage of cell 2D has risen to around 3.81V (only 0.02V lower than the other cells). The average cell voltage $V_{ave}$ is around 3.83V at this time. In this example, 0.02V is close to the limit to which the cell voltages can be equalized. This limit is determined by δ described above, and any other voltage drops in the recharging path of the under-voltage cell. $V^{DC}_D$ will remain around 0.02V below $V^{DC}_{A-C,E-H}$ throughout discharging and the cell 2D will approach the deep-discharge threshold at a similar time to the other cells 2A–H,E–H even though it was initially at a significantly lower voltage.

Similarly, if cell 2D is prone a more rapid increase voltage during charging, the cell equalizing circuit will ensure its voltage is kept at only 0.02V above the voltages of the other cells.

Figure 7:
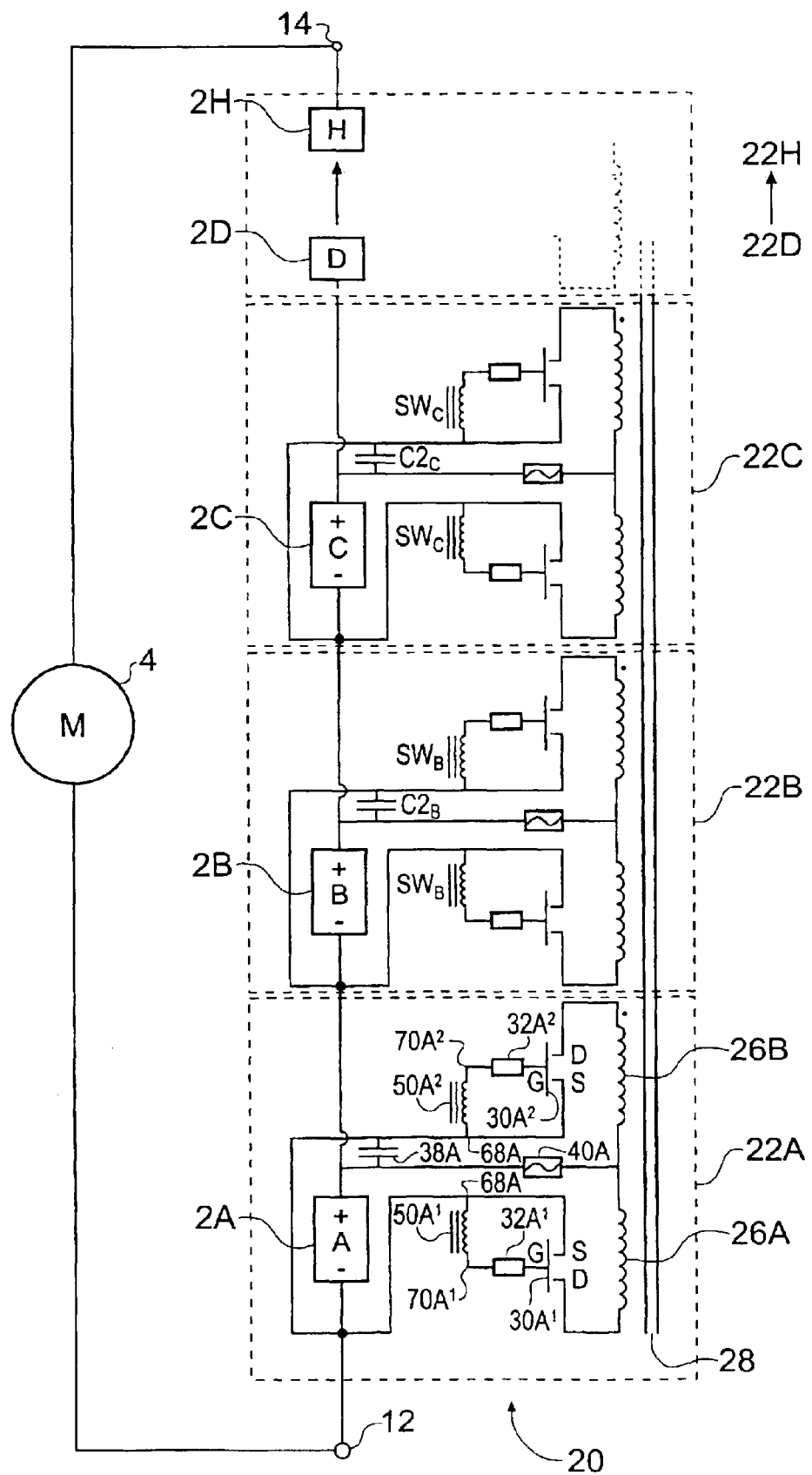
FIG. 7 shows an alternative example to FIG. 3 in which the cell equalizing circuit is controlled by inductively coupled control signals.

FIGS. 7 is a schematic diagrams of a second example showing how an equalizing circuit 20 of the type shown in FIG. 2 can be implemented. Many features are common to those of the equalizing circuit shown in FIG. 3. These features are given the same reference numerals and are not described further. Some of the features seen in FIG. 3 are not present in this example, for example the tie-down resistors and input capacitors are not included. The equalizing circuit 20 again comprises eight circuit modules 22A–H (one for each cell 2A–H), and again for simplicity, only three of the circuit modules 22A–H (and three corresponding cells 2A–C) are shown. Again only circuit module 22A is described in detail, the other circuit modules 22B–H being similar.

Whereas in the equalizing circuit shown in FIG. 3 the FETs $30A^1$, $30A^2$ are switched on by capacitively coupled AC control signals, in the example shown in FIG. 7 the FETs $30A^1$, $30A^2$ are switched on by inductively coupled AC control signals generated by an AC control signal generating unit.

Figure 8:
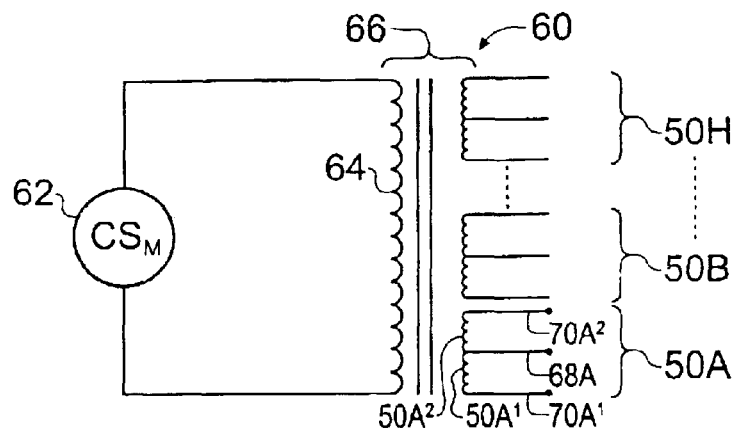
FIG. 8 shows a transformer for generating inductively coupled control signals for use in the cell equalizing circuit shown in FIG. 7.

FIG. 8 shows an AC control signal generating unit 60 for use in the equalizing circuit 20 shown in FIG. 7. The control signal generating unit comprises a master control signal generator 62 coupled to an input winding 64 of a control signal transformer 66. The control signal transformer 66 includes eight output windings 50A–H. The output windings 50A–H are nominally identical and only output winding 50A is described further. The output winding 50A includes a center-tap terminal 68A and so can be considered to comprise first and second output windings $50A^1$ and $50A^2$ connected between the center-tap terminal and to first and second end-tap terminals $70A^1$, $70A^2$ respectively.

The first and second output windings $50A^1$ and $50A^2$ are also seen in FIG. 7 and are connected such that the center-tap terminal 68A is connected to the cathode of cell 2A, the first end-tap terminal $70A^1$ is connected to the first gate-input resistor $32A^1$ and the second end-tap terminal $70A^2$ is connected to the second gate-input resistor $32A^2$ as indicated in the figure.

Figure 9:
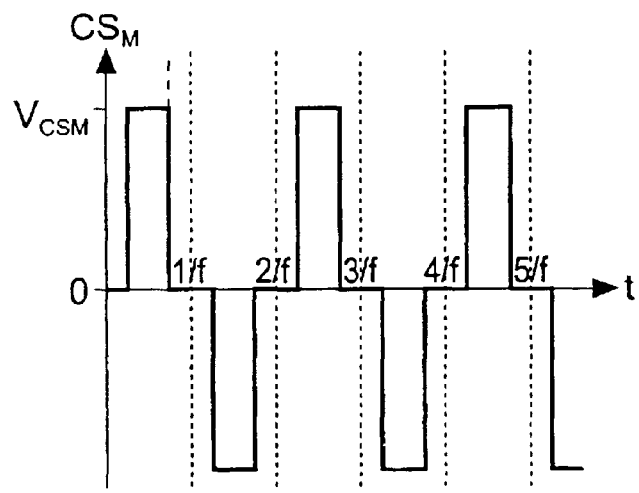
FIG. 9 shows an example master control signal waveforms for application to the transformer shown in FIG. 8.

FIG. 9 is a graph schematically showing an example master control signal $CS_M$ generated by the master control signal generator 62 as a function of time t. The control signal $CS_M$ can be generated in any known manner. In this example, the master control signal comprises a series of square wave pulses of alternating polarity, each separated by a dead time. As above, the dead time is included to avoid both FETs being switched on simultaneously. The master control signal operates at frequency $f$ and had an amplitude $V_{CSM}$.

Figure 10A:
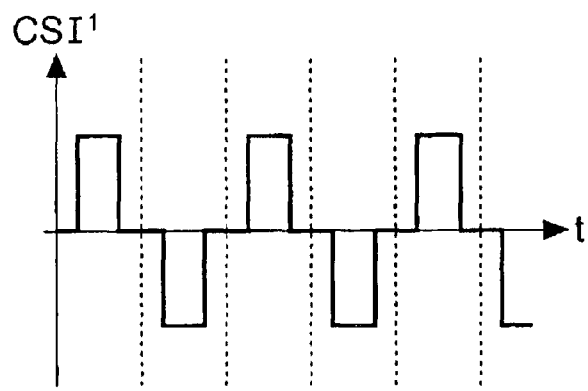
FIGS. 10a and 10b respectively show examples of first and second control signal waveforms for controlling the cell equalizing circuit shown in FIG. 7.

FIG. 10a is a graph schematically showing a first inductively coupled AC control signal $CSI^1$ which develops at the first end-tap terminal $70A^1$ relative to the center-tap terminal 68A in response to the master control signal $CS_M$ shown in FIG. 9.

Figure 10B:
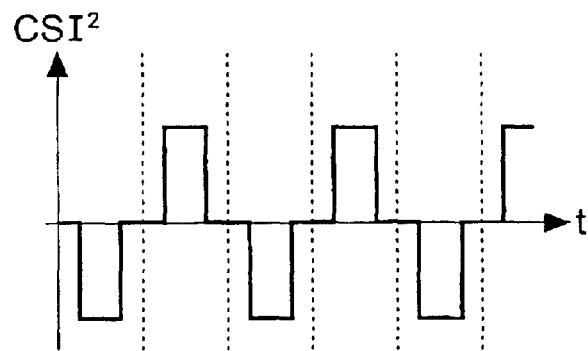

FIG. 10b is a graph schematically showing a second inductively AC coupled control signal $CSI^2$ which develops at the second end-tap terminal $70A^2$ relative to the center-tap terminal 68A in response to the master control signal $CS_M$ shown in FIG. 9.

The first and second inductively coupled AC control signals $CSI^1$, $CSI^2$ have the same general form of the master control signal CSM although the second inductively coupled AC control signal $CSI^2$ is inverted. The amplitudes of the inductively coupled AC control signals $CSI^1$, $CSI^2$ are equal, and depend on the geometry of the control signal transformer 60 and $V_{CSM}$. These are chosen to ensure the amplitudes of the inductively coupled AC control signals $CSI^1$, $CSI^2$ are sufficient to switch on the FETs via the gate-input resistors $32A^1$, $32A^2$.

The FET $30A^1$ is switched on during the positive going pulses of the first inductively coupled AC control signal $CSI^1$. The FET $30A^2$ is switched on during the positive going pulses of the second inductively coupled AC control signal $CSI^2$. This alternate switching on of the FETs $30A^1$, $30A^2$ allows the cell equalizing circuit to operate in the same manner as described above with regard to the first example cell equalizing circuit shown in FIG. 3.

Figure 11:
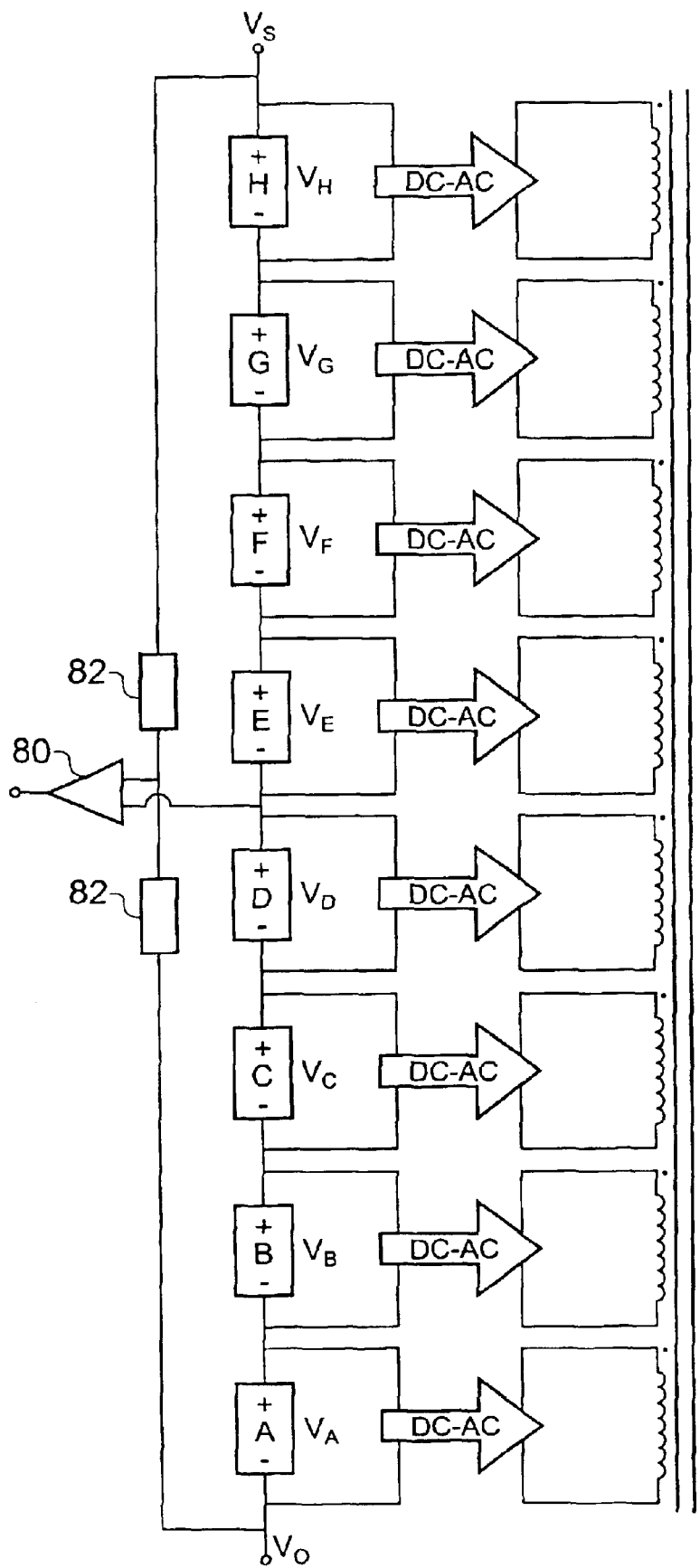
FIG. 11 shows a variant of the cell equalizing circuit shown in FIG. 2.

FIG. 11 shows a variant of the generalized cell equalizing circuit 20 shown in FIG. 2. In addition to those features seen in FIG. 2 and which will be understood from the description above, the variant cell equalizing circuit further includes a voltage comparator 80 and a pair of voltage dividing resistors 82. The pair of voltage dividing resistors 82 have the same resistance, in this case 10 kΩ, such that the voltage at their junction, which is applied to a first input of the voltage comparator 80 is half that of the overall battery. A second input to the voltage comparator is connected to the junction between cells 22D and 22E. If the cell voltages of all of the cells in the battery are correctly equalized, the voltage applied to the second input of the voltage comparator is the same as that applied to the first input. If the cell voltages of all of the cells in the battery are not correctly equalized, the voltage applied to the second input of the voltage comparator is not the same as that applied to the first input and a warning signal is generated by the voltage comparator. The warning signal may, for instance, be arranged to automatically disconnect a load or charger connected to the battery, or simply used as an indicator that there is a cell voltage imbalance. In practice a comparison window will be defined within which small imbalances in the inputs to the first and second voltage comparator inputs will not cause the voltage comparator to generate the warning signal.

Whilst in the above examples the DC to AC converter functionality has been performed by FET switches, it will be appreciated that the functionality of the DC to AC converter could be provided in many other ways. For example, using mechanical relays, pre-packaged semiconductor relays, other transistor types or control signals similar to those described above could be used to drive operational amplifiers powered by each cell into alternating positive and negative saturation. However, a FET switch may be preferred since it has a low voltage drop in conduction (i.e. low δ) and can operate over a wide range of frequencies.

During operation, a cell equalizing circuit such as that shown in FIG. 2 can be configured to function whilst consuming only around 0.25 watts of power from the battery of cells. By allowing more efficient use of the total capacity of a battery of cells, the cell equalizing circuit will usually have a net positive influence on the battery life during a single discharge, notwithstanding the power drain it causes.

Cell equalizing circuits such as those described above can be switched on and off to operate as desired by a particular application. For instance the cell equalizing circuit could be configured to operate only when a battery is being charged and/or when it is under load. Similarly, it could be configured to operate only when a load draws a current above a preset threshold. A more simple solution is to activate the cell equalizing circuit whenever a battery driven device incorporating the equalizing circuit is switched on. Whilst an equalizing circuit may operate continuously, if a battery is not being loaded or charged, the power drawn by the cell equalizing circuit, although modest, will generally represent an unnecessary drain on the batteries since, as seen in FIG. 6, cell voltages in a battery are rapidly brought close to equilibrium. The turning on of a cell equalizing circuit may also be responsive to a sensor of the cell voltages. For instance, the output of a voltage comparator configured similarly to that shown in the cell equalizing circuit shown in FIG. 11 could be used to indicate an imbalance in cell voltages above a predetermined level has developed and the cell equalizing circuit should be switched on.

Figure 12:
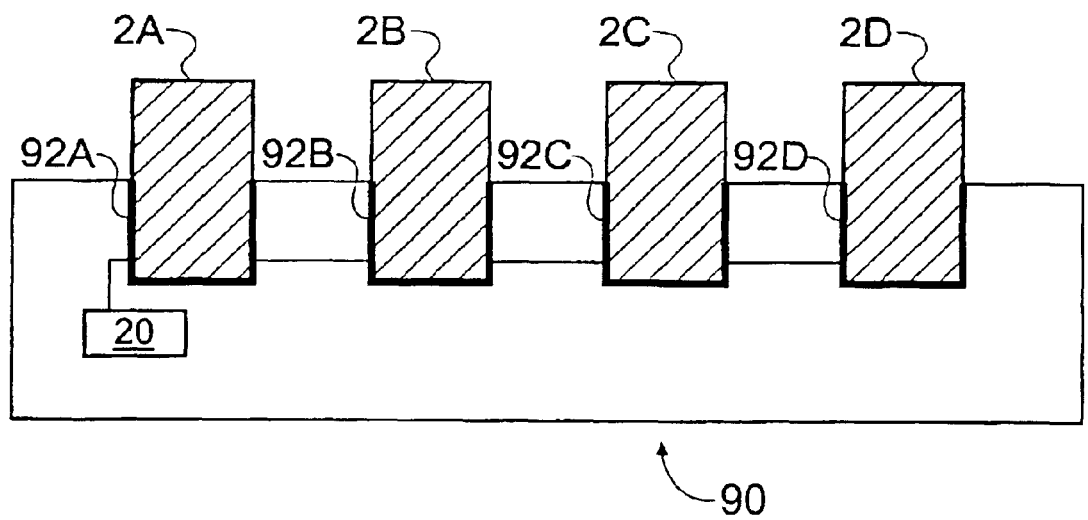
FIG. 12 shows a charger including the cell equalizing circuit similar to that shown in FIG. 2, although configured to receive four (not eight) cells for charging.

FIG. 12 schematically shows a stand alone battery charger 90 containing a cell equalizing circuit 20 suitable for charging a battery of four cells 2A–D. The cells 2A-2D are received by four cell receptacles 92A–D. The cell receptacles 92A–D include appropriately configured connections, for example spring loaded contacts, for coupling the cells 2A–D into the cell equalizing circuit 20. The battery charger 90 also includes a standard current source suitable for recharging serially connected cells. When charging is complete, the cells 2A–2D may be removed and used as desired.

Cell equalizing circuits of the type described above can also be employed as an integral part of a power supply for a wide range of electrical equipment. For example, cell equalizing circuits can be used to improve the battery performance of portable computers, portable video equipment, digital cameras, global positioning receivers, portable televisions, mobile phones, submarines, electric vehicles, wheel chairs etc.

It will be appreciated that whilst in the above embodiments the circuit modules are configured to equalize the voltages of each individual cell in a battery. In other examples a smaller number of circuit modules may be employed whereby each circuit module equalizes the summed voltage of a group of cells, rather than an individual cell. The group of cells may be connected in series (in which case cell voltage differences within the group of cells will not be equalized) or in parallel (in which case all cells will be equalized).

Whilst the above examples relate to rechargeable cells, differences in cell discharge characteristics can also limit the efficient use of non-rechargeable cells. For example, if the voltage of one of the cells in a battery decreases significantly during use, the total battery voltage may fall below the minimum required to drive a load even though there is still sufficient overall energy remaining in the cells to the work required by the load. With some kinds of non-rechargeable cells it may be inappropriate to operate a cell equalizing circuit when a battery of the cells is under no (or little) load. In these cases, large cell voltage differences may lead to an attempted net charging of an under-voltage cell. However, when a battery of non-rechargeable cell is under load, cell equalizing circuits of the type described above could be usefully employed to ensure that each cell voltage falls at the same rate.

What is claimed is:

1. An electric circuit for receiving a battery of cells in series, comprising:
   a plurality of DC-to-AC converters each having a DC-side arranged to connect across positive and negative terminals of cells received by the circuit and an AC-side for carrying an AC voltage converted from the DC-side; and
   an inductive coupling between the AC-sides of the DC-to-AC converters to provide an effective current transfer between cells responsive to differences in DC voltages between them; and
   wherein each of the DC-to-AC converters comprises a first switch responsive to a first control signal for providing a first polarity of the AC voltage and a second switch responsive to a second control signal for providing a second polarity of the AC voltage.

2. The electric circuit according to claim 1, wherein the inductive coupling comprises transformer windings.

3. The electric circuit according to claim 2, wherein each of the transformer windings comprises a center-tap between two end-taps such that alternate phases of the AC voltages are applied between the center-tap and one or other of the end-taps.

4. An electrically powered device including an electric circuit according to claim 2.

5. The electrically powered device according to claim 4, wherein the electrically powered device is one of a portable computer, a portable video camera, a digital camera, a global positioning receiver, a portable television, a mobile telephone, a submarines, an electric vehicles, or a wheel chair.

6. The electric circuit according to claim 1, wherein the control signals are coupled to the switches via one or more control signal capacitors.

7. An electrically powered device including an electric circuit according to claim 6.

8. The electrically powered device according to claim 7, wherein the electrically powered device is one of a portable computer, a portable video camera, a digital camera, a global positioning receiver, a portable television, a mobile telephone, a submarines, an electric vehicles, or a wheel chair.

9. An electrically powered device including an electric circuit according to claim 1.

10. The electric circuit according to claim 1, wherein the first and second switches are field effect transistors.

11. An electrically powered device including an electric circuit according to claim 10.

12. The electrically powered device according to claim 11, wherein the electrically powered device is one of a portable computer, a portable video camera, a digital camera, a global positioning receiver, a portable television, a mobile telephone, a submarines, an electric vehicles, or a wheel chair.

13. The electric circuit according to claim 1, wherein the control signals are coupled to the switches via one or more control signal transformers.

14. An electrically powered device including an electric circuit according to claim 13.

15. The electrically powered device according to claim 14, wherein the electrically powered device is one of a portable computer, a portable video camera, a digital camera, a global positioning receiver, a portable television, a mobile telephone, a submarines, an electric vehicles, or a wheel chair.

16. An electric circuit for receiving a battery of cells in series, comprising:
  a plurality of DC-to-AC converters each having a DC-side arranged to connect across positive and negative terminals of cells received by the circuit and an AC-side for carrying an AC voltage converted from the DC-side;
  an inductive coupling between the AC-sides of the DC-to-AC converters to provide an effective current transfer between cells responsive to differences in DC voltages between them; and
  a comparator configured to output a status responsive to a comparison between a first voltage dependent on a first group of cells and a second voltage dependent on a second group of cells.

17. An electrically powered device including an electric circuit according to claim 16.

18. The electrically powered device according to claim 17, wherein the electrically powered device is one of a portable computer, a portable video camera, a digital camera, a global positioning receiver, a portable television, a mobile telephone, a submarines, an electric vehicles, or a wheel chair.

19. The electrically powered device according to claim 9, wherein the electrically powered device is one of a portable computer, a portable video camera, a digital camera, a global positioning receiver, a portable television, a mobile telephone, a submarines, an electric vehicles, or a wheel chair.

* * * * *